United States Patent
Ayres et al.

(10) Patent No.: US 7,638,755 B2
(45) Date of Patent: Dec. 29, 2009

(54) SENSING ABSOLUTE POSITION OF AN ENCODED OBJECT

(75) Inventors: Mark R. Ayres, Boulder, CO (US); Larry Fabiny, Boulder, CO (US); Keith W. Malang, Longmont, CO (US); Curtis Alan Shuman, Boulder, CO (US)

(73) Assignee: Inphase Technologies, Inc., Longmont, CO (US)

( * ) Notice: Subject to any disclaimer, the term of this patent is extended or adjusted under 35 U.S.C. 154(b) by 0 days.

(21) Appl. No.: 12/113,516

(22) Filed: May 1, 2008

(65) Prior Publication Data
US 2008/0203282 A1      Aug. 28, 2008

Related U.S. Application Data

(62) Division of application No. 11/440,372, filed on May 25, 2006.

(60) Provisional application No. 60/684,531, filed on May 26, 2005.

(51) Int. Cl.
*G01D 5/34* (2006.01)

(52) U.S. Cl. .................. 250/231.13; 356/614; 359/436; 341/13

(58) Field of Classification Search ................................ 250/231.13–231.18; 356/614; 359/436; 341/13, 14; 33/1
See application file for complete search history.

(56) References Cited

U.S. PATENT DOCUMENTS

| | | | |
|---|---|---|---|
| 5,058,124 A | 10/1991 | Cameron et al. | |
| 5,066,088 A | 11/1991 | Davies et al. | |
| 5,123,073 A | 6/1992 | Pimpinella | |
| 5,499,732 A | 3/1996 | Nishimoto | |
| 5,500,910 A | 3/1996 | Boudreau et al. | |
| 5,566,387 A * | 10/1996 | Dewald ...................... | 369/103 |
| 5,692,083 A | 11/1997 | Bennett | |
| 5,710,672 A | 1/1998 | Roberts et al. | |
| 5,719,691 A | 2/1998 | Curtis et al. | |
| 5,886,971 A | 3/1999 | Feldman et al. | |
| 5,912,872 A | 6/1999 | Feldman et al. | |
| 5,932,045 A | 8/1999 | Campbell et al. | |

(Continued)

FOREIGN PATENT DOCUMENTS

WO    WO 2005/059902 A3    6/2005

OTHER PUBLICATIONS

PCT/US2007/06094 International Search Report and the Written Opinion of the International Searching Authority, or the Declaration, mailed Aug. 22 2008.

(Continued)

*Primary Examiner*—Seung C Sohn
(74) *Attorney, Agent, or Firm*—Vedder Price P.C.; Ajay A. Jagtiani

(57) ABSTRACT

In one aspect of the present invention, a device for sensing an absolute position of an encoded object, comprising: a position tracking module comprising: a track illumination module configured to illuminate the encoded object with one more light beams, and to detect one or more light beams resulting from said illumination of said encoded object; and an absolute position determinator configured to determine the absolute position of the encoded object based on said one or more light beams resulting from said illumination of said encoded object.

6 Claims, 13 Drawing Sheets

U.S. PATENT DOCUMENTS

| | | |
|---|---|---|
| 5,956,106 A | 9/1999 | Peterson et al. |
| 6,047,008 A | 4/2000 | Funakawa |
| 6,081,381 A | 6/2000 | Shalapenok et al. |
| 6,103,454 A | 8/2000 | Dhar et al. |
| 6,104,690 A | 8/2000 | Feldman et al. |
| 6,137,601 A | 10/2000 | Khoury et al. |
| 6,265,240 B1 | 7/2001 | Dautartas et al. |
| 6,344,148 B1 | 2/2002 | Park et al. |
| 6,389,045 B1 | 5/2002 | Mann et al. |
| 6,414,763 B1 | 7/2002 | Hesselink et al. |
| 6,449,627 B1 | 9/2002 | Baer et al. |
| 6,482,551 B1 | 11/2002 | Dhar et al. |
| 6,614,566 B1 | 9/2003 | Curtis et al. |
| 6,650,447 B2 | 11/2003 | Curtis et al. |
| 6,743,552 B2 | 6/2004 | Setthachayanon et al. |
| 6,747,257 B1 | 6/2004 | Farnsworth et al. |
| 6,765,061 B2 | 7/2004 | Dhar et al. |
| 6,768,426 B2 | 7/2004 | Nekado et al. |
| 6,780,546 B2 | 8/2004 | Trentler et al. |
| 6,796,697 B1 | 9/2004 | Bragg et al. |
| 6,862,121 B2 | 3/2005 | Psaltis et al. |
| 6,909,529 B2 | 6/2005 | Curtis |
| 6,925,225 B2 | 8/2005 | Engel et al. |
| 6,956,998 B2 | 10/2005 | Shahar et al. |
| 6,992,805 B2 | 1/2006 | Ingwall et al. |
| 7,027,197 B2 | 4/2006 | Newswanger et al. |
| 7,092,133 B2 | 8/2006 | Anderson et al. |
| 2003/0206320 A1 | 11/2003 | Cole et al. |
| 2004/0027625 A1 | 2/2004 | Trentler et al. |
| 2004/0027668 A1 | 2/2004 | Ayres |
| 2004/0223330 A1 | 11/2004 | Broude et al. |
| 2005/0013231 A1 | 1/2005 | Kawano et al. |
| 2005/0041000 A1 | 2/2005 | Plut |
| 2005/0141810 A1 | 6/2005 | Vaez-Iravani et al. |
| 2005/0146762 A1 | 7/2005 | Hoogland et al. |
| 2005/0190451 A1 | 9/2005 | Hansen |
| 2005/0270855 A1 | 12/2005 | Earhart et al. |
| 2005/0270856 A1 | 12/2005 | Earhart et al. |
| 2005/0286388 A1 | 12/2005 | Ayres et al. |
| 2006/0274393 A1 | 12/2006 | Fotheringham et al. |
| 2006/0274394 A1 | 12/2006 | Riley et al. |
| 2006/0275670 A1 | 12/2006 | Riley et al. |
| 2006/0279818 A1 | 12/2006 | Ayres et al. |
| 2006/0279819 A1 | 12/2006 | Krneta et al. |
| 2006/0279820 A1 | 12/2006 | Riley et al. |
| 2006/0279821 A1 | 12/2006 | Riley et al. |
| 2006/0279822 A1 | 12/2006 | Krneta et al. |
| 2006/0279823 A1 | 12/2006 | Riley et al. |
| 2006/0279824 A1 | 12/2006 | Riley et al. |
| 2006/0280096 A1 | 12/2006 | Riley et al. |
| 2006/0281021 A1 | 12/2006 | Riley et al. |
| 2006/0291022 A1 | 12/2006 | Redmond et al. |
| 2006/0291023 A1 | 12/2006 | Riley et al. |

OTHER PUBLICATIONS

PCT/US2006/19906 International Search Report and the Written Opinion of the International Searching Authority, or the Declaration, mailed Sep. 16, 2008.

Y. Nakayama, et al., "Diffuser with Pseudorandom Phase Sequence," *Opt. Soc. Am.*, vol. 69 (No. 10), (Oct. 1979), pp. 1367-1372.

Smothers, et al., "Photopolymers for Holography," *SPIE OE/Laser Conference*, (Los Angeles, Calif., 1990), pp. 1212-1203.

Psaltis, et al., "Holographic Memories," *Scientific American*, Nov. 1995.

Dhar, L., et al., "Recording Media That Exhibit High Dynamic Range for Holographic Storage," *Optics Letters*, 24, (1999): pp. 487 et. seq.

Dickey, "Laser Beam Shaping," Optics & Photonics News (Apr. 2003), pp. 30-35.

Masters, A., et al., "Beam-Shaping Optics Expand Excimer Laser Applications," Laser Focus World (Jun. 2005).

Fuertes, J.M., et al., "Absolute Type Shaft Encoding Using LFSR Sequences With Prescribed Length" (2006).

McLeod, et al. "Micro-Holographic Multi-Layer Optical Disk Data Storage," *International Symposium on Optical Memory and Optical Data Storage* (Jul. 2005).

Shelby, "Media Requirements for Digital Holographic Data Storage," *Holographic Data Storage*, Section 1.3 (Coufal, Psaltis, Sincerbox Eds. 2003).

\* cited by examiner

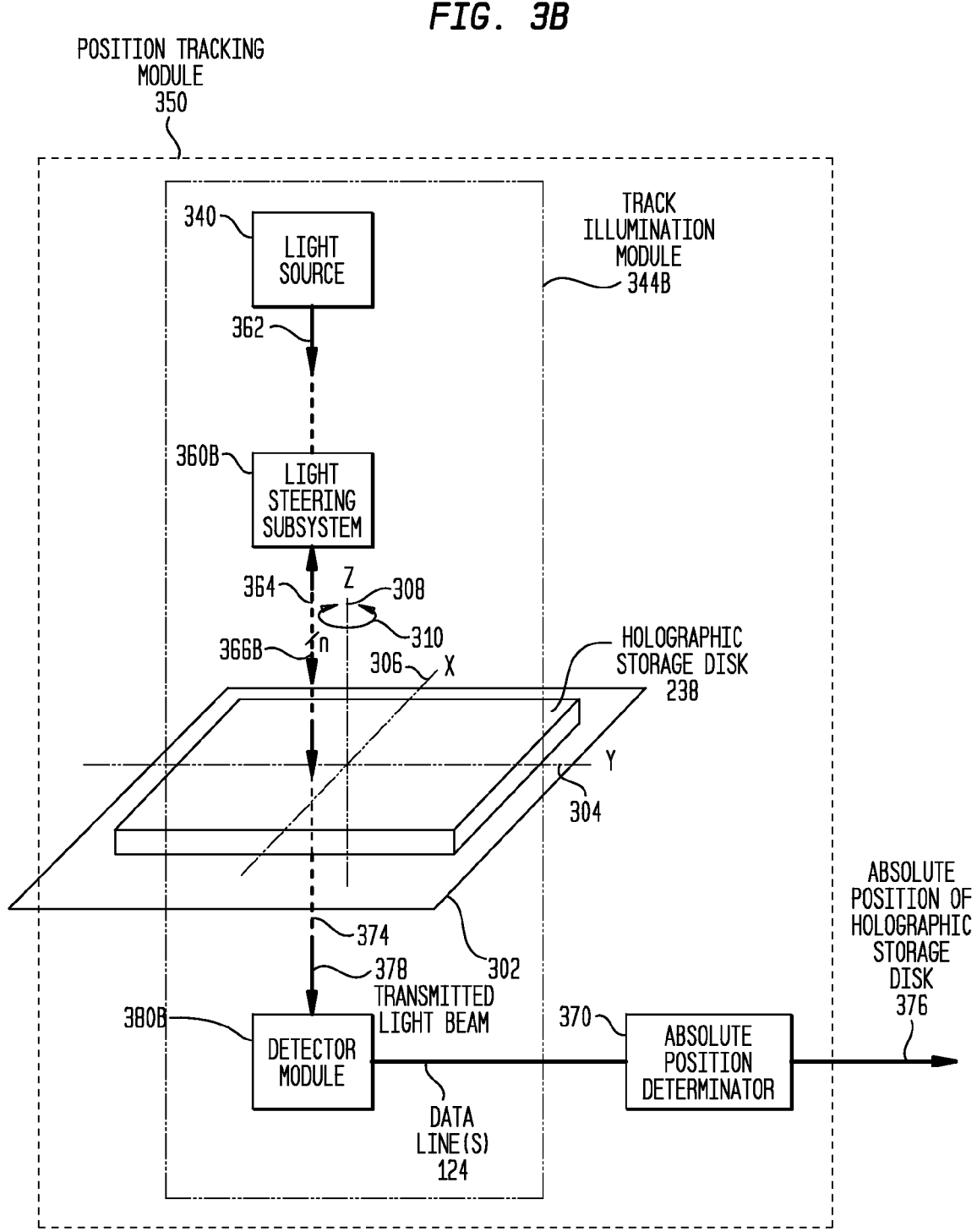

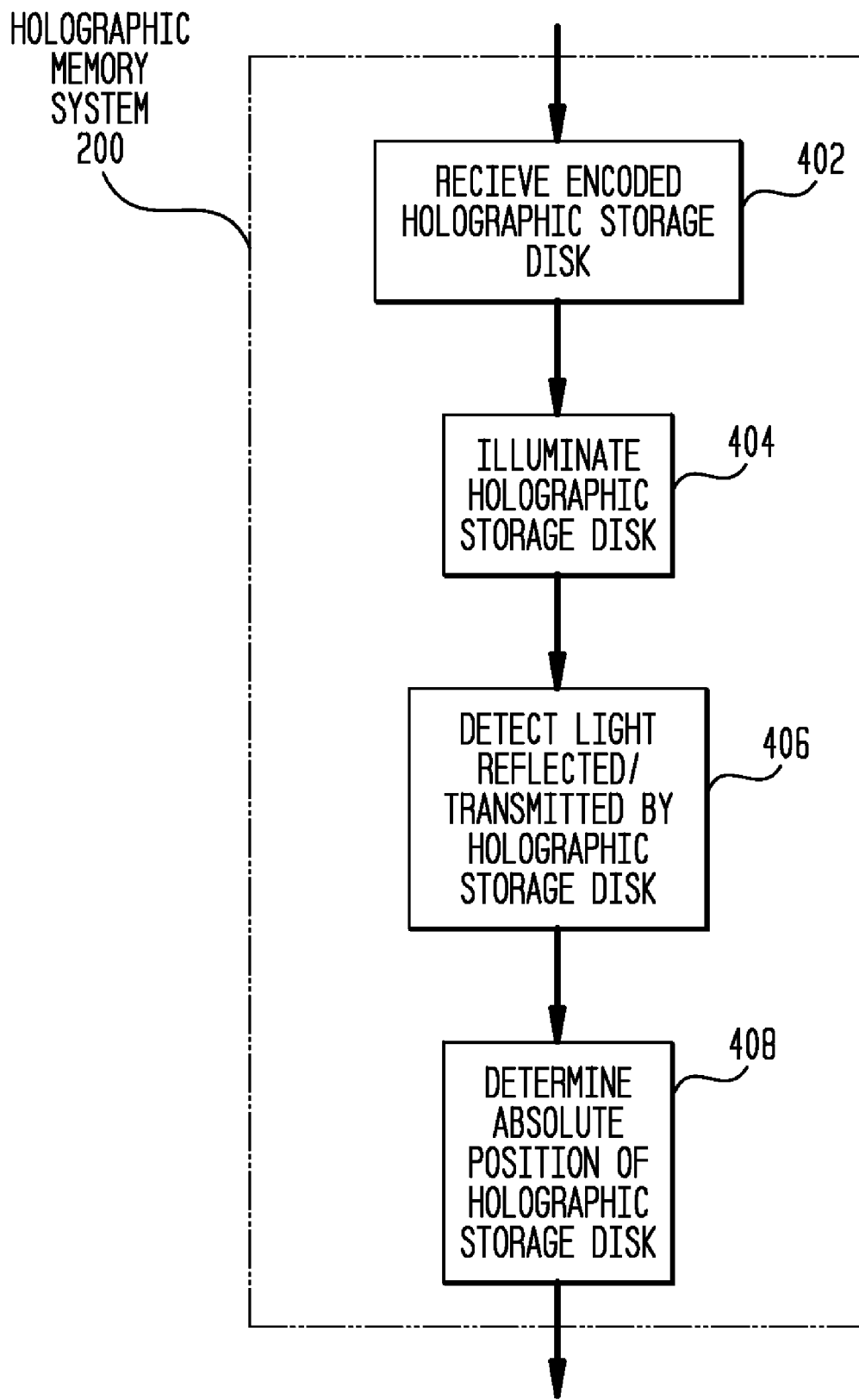

FIG. 8
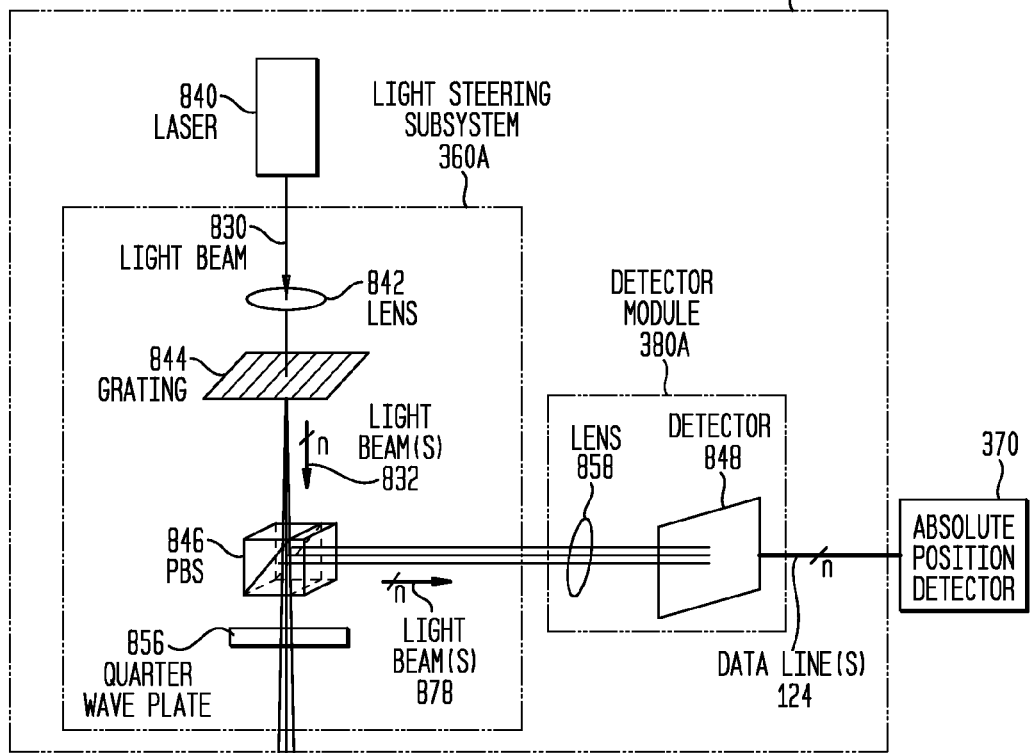
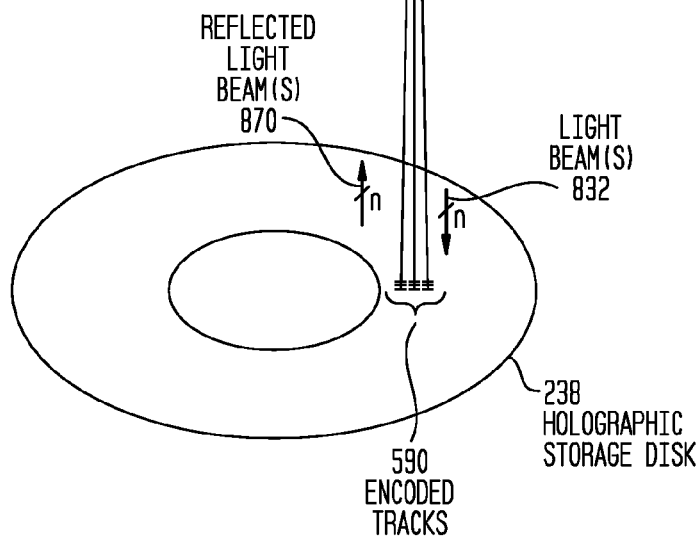

ically access holographic representations (i.e., holograms) substantially throughout the spatial extent of the storage medium. This allows holographic memory systems to advantageously store a large amount of data.

SENSING ABSOLUTE POSITION OF AN ENCODED OBJECT

CROSS-REFERENCE TO RELATED APPLICATIONS

This application is a divisional of U.S. application Ser. No. 11/440,372, entitled "SENSING ABSOLUTE POSITION OF AN ENCODED OBJECT," filed on May 25, 2006, which claims the benefit of U.S. Provisional Application No. 60/684,531, entitled "METHODS FOR MAKING A HOLOGRAPHIC STORAGE DRIVE SMALLER, CHEAPER, MORE ROBUST AND WITH IMPROVED PERFORMANCE," filed May 26, 2005. The entire disclosure and contents of the above patents and applications are hereby incorporated by reference. This application also makes reference to the following co-pending U.S. patent applications. The first application is U.S. application Ser. No. 11/440,370, entitled "ILLUMINATIVE TREATMENT OF HOLOGRAPHIC MEDIA," filed May 25, 2006. The second application is U.S. application Ser. No. 11/440,446, entitled "METHODS AND SYSTEMS FOR LASER MODE STABILIZATION," filed May 25, 2006. The third application is U.S. application Ser. No. 11/440,447, entitled "PHASE CONJUGATE RECONSTRUCTION OF HOLOGRAM," filed May 25, 2006. The fourth application is U.S. application Ser. No. 11/440,448, entitled "IMPROVED OPERATIONAL MODE PERFORMANCE OF A HOLOGRAPHIC MEMORY SYSTEM," filed May 25, 2006. The fifth application is U.S. application Ser. No. 11/440,359, entitled "HOLOGRAPHIC DRIVE HEAD AND COMPONENT ALIGNMENT," filed May 25, 2006. The sixth application is U.S. application Ser. No. 11/440,358, entitled "OPTICAL DELAY LINE IN HOLOGRAPHIC DRIVE," filed May 25, 2006. The seventh application is U.S. application Ser. No. 11/440,357, entitled "CONTROLLING THE TRANSMISSION AMPLITUDE PROFILE OF A COHERENT LIGHT BEAM IN A HOLOGRAPHIC MEMORY SYSTEM," filed May 25, 2006. The eighth application is U.S. application Ser. No. 11/440,371, entitled "SENSING POTENTIAL PROBLEMS IN A HOLOGRAPHIC MEMORY SYSTEM," filed May 25, 2006. The ninth application is U.S. application Ser. No. 11/440,367, entitled "POST-CURING OF HOLOGRAPHIC MEDIA," filed May 25, 2006. The tenth application is U.S. application Ser. No. 11/440,366, entitled "ERASING HOLOGRAPHIC MEDIA," filed May 25, 2006. The eleventh application is U.S. application Ser. No. 11/440,365, entitled "LASER MODE STABILIZATION USING AN ETALON," filed May 25, 2006. The twelfth application is U.S. application Ser. No. 11/440,369, entitled "HOLOGRAPHIC DRIVE HEAD ALIGNMENTS," filed May 25, 2006. The thirteenth application is U.S. application Ser. No. 11/440,368, entitled "REPLACEMENT AND ALIGNMENT OF LASER," filed May 25, 2006. The entire disclosure and contents of the foregoing U.S. Patent Applications are hereby incorporated by reference.

BACKGROUND

1. Field of the Invention

The present invention relates generally to sensing the position of an object, and more particularly, to sensing absolute position of an encoded object.

2. Related Art

Developers of information storage devices continue to seek increased storage capacity. As part of this development, memory systems employing holographic optical techniques, referred to herein as holographic memory systems, have been suggested as alternatives to conventional memory devices.

Typically, holographic memory systems read/write data to/from a photosensitive storage medium. Such systems typically access holographic representations (i.e., holograms) substantially throughout the spatial extent of the storage medium. This allows holographic memory systems to advantageously store a large amount of data.

Holographic memory systems may be designed to record data as single bits of information (i.e., bit-wise data storage). See McLeod et al. "Micro-Holographic Multi-Layer Optical Disk Data Storage," *International Symposium on Optical Memory and Optical Data Storage* (July 2005). Holographic memory systems may also be designed to record an array of data that may be a 1-dimensional linear array (i.e., a 1×N array, where N is the number linear data bits), or a 2-dimension array commonly referred to as a "page-wise" memory system. Page-wise memory systems may involve the storage and readout of an entire two-dimensional representation (i.e., a page) of data.

Holographic memory systems typically involve the three-dimensional storage of holograms as a pattern of varying refractive index and/or absorption imprinted into the storage medium. In general, holographic memory systems operate to perform a data write (also referred to as a data record or data store operation, simply "write" operation herein) by combining two coherent light beams at a particular point within the storage medium. Specifically, a data-encoded light beam is combined with a reference light beam to create an interference pattern in the photosensitive storage medium. The interference pattern induces material alterations in the storage medium to form a hologram. The formation of the hologram is a function of the relative amplitudes, phase, coherence, and polarization states of the data-encoded and reference light beams. It is also dependent on the relative wavelength of the incident beams as well as the three-dimensional geometry at which the data and reference beams are projected into the storage medium.

Holographically-stored data is retrieved from the holographic memory system by performing a read (or reconstruction) of the stored data. The read operation is performed by projecting a reconstruction or probe beam into the storage medium at the same angle, wavelength, phase and position as the reference beam used to record the data, or compensated equivalents thereof. The hologram and the reconstruction beam interact to reconstruct the data beam. The reconstructed data beam is then detected by a sensor, such as a photodetector, sensor array, camera, etc. The reconstructed data is then processed for delivery to an output device.

In order to achieve proper operation of a holographic memory system, the holographic memory system must determine the position of the holographic storage medium relative to the optical components of the system. Thus, it is desirable to quickly and accurately determine the position of the holographic storage medium.

SUMMARY

In one aspect of the present invention, a device for sensing an absolute position of an encoded object, comprising: a position tracking module comprising: a track illumination module configured to illuminate the encoded object with one more light beams, and to detect one or more light beams resulting from said illumination of said encoded object; and an absolute position determinator configured to determine the absolute position of the encoded object based on said one or more light beams resulting from said illumination of said encoded object.

In another aspect of the present invention, a holographic memory system is disclosed. The storage system comprises an encoded recording medium configured to holographically store information; at least one source of coherent light; and a position tracking module comprising: a track illumination module configured to illuminate said encoded storage medium with one more light beams, wherein said track illumination module is configured to detect one or more light beams resulting from said illumination of said encoded storage medium; and an absolute position determinator configured to determine the absolute position of said encoded storage medium based on said one or more light beams resulting from said illumination of said encoded storage medium.

In a further aspect of the present invention, a method of determining the absolute position of an encoded medium comprising: illuminating said encoded medium with one or more light beams; detecting the resulting illumination from said encoded medium; and determining the absolute position of said encoded medium based on the detected illumination from said encoded medium.

BRIEF DESCRIPTION OF THE DRAWINGS

Embodiments of the present invention will be described in conjunction with the accompanying drawings, in which:

FIG. 3B is a functional block diagram of components of a position tracking module as may be implemented in a holographic memory system such as that illustrated in FIGS. 1, 2A, and 2B, in accordance with another embodiment of the present invention;

FIG. 4 is a high level flowchart in accordance with one embodiment of the present invention;

FIG. 8 is an enlarged functional block diagram of the components of a position tracking module in accordance with the embodiments of the present invention illustrated in FIG. 3A;

DETAILED DESCRIPTION

Aspects of the present invention are generally directed to a position tracking module configured to sense the absolute position of an encoded object. The position tracking module comprises a track illumination module and an absolute position determinator. The track illumination module comprises a light source that directs a light beam towards one or more tracks on the object, and a light steering subsystem positioned between the light source and the object to form the source light beam into one or more light beams, and to direct each such light beam to one of the track(s) on the object. The track illumination module also comprises a detector module. In certain embodiments, the detector module detects a diffraction pattern resulting from a light beam reflected from a track on the object. In other embodiments, the detector module detects a diffraction pattern resulting from a light beam transmitted by a track on the object. The detector module provides the absolute position determinator with a signal resulting from the detected diffraction. Absolute position determinator determines the absolute position of the medium based on a diffraction pattern signal from the detector module.

In certain applications, the present invention is embodied in a position tracking module configured to sense the absolute position of a holographic storage medium in a holographic memory system; that is, a data storage and retrieval system that implements holographic optical techniques.

Figure 1:
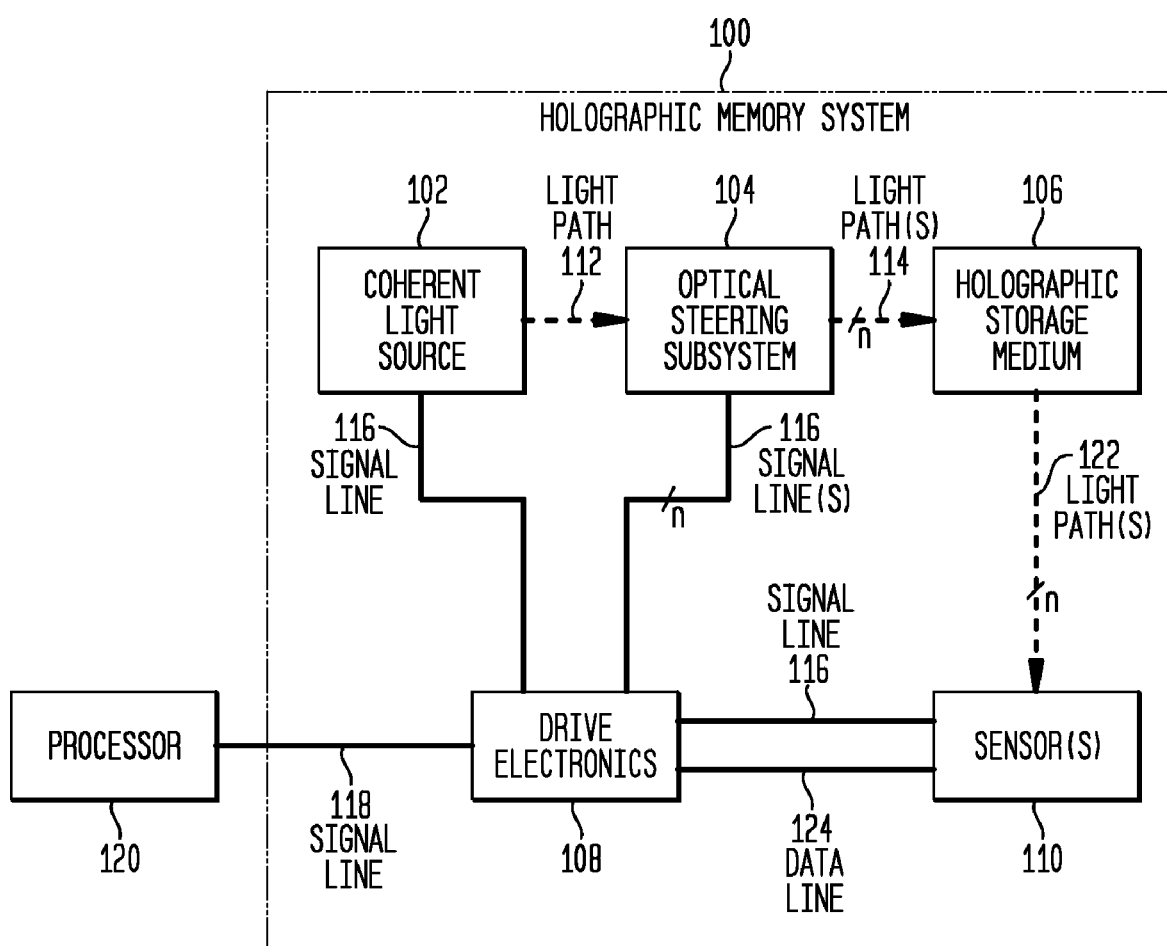
FIG. 1 is schematic block diagram of an exemplary holographic memory system in which embodiments of the present invention may be advantageously implemented.

FIG. 1 is a block diagram of an exemplary holographic memory system in which embodiments of the present invention may be implemented. It should be appreciated that although embodiments of the present invention will be described in the context of the exemplary holographic memory system shown in FIG. 1, the present invention may be implemented in connection with any system now or later developed that implement holographic optical techniques.

Holographic memory system 100 receives along signal line 118 signals transmitted by an external processor 120 to read and write data to a photosensitive holographic storage medium 106. As shown in FIG. 1, processor 120 communicates with drive electronics 108 of holographic memory system 100. Processor 120 transmits signals based on the desired mode of operation of holographic system 100. For ease of description, the present invention will be described with reference to read and write operations of a holographic memory system. It should be apparent to one of ordinary skill in the art, however, that the present invention applies to other operational modes of a holographic memory system, such as Pre-Cure, Post-Cure, Write Verify, or any other operational mode implemented now or in the future in a holographic memory system.

Using control and data information from processor 120, drive electronics module 108 transmits signals along signal lines 116 to various components of holographic memory system 100. One such component that receives signals from drive electronics 108 is coherent light source 102. Coherent light source 102 may be any light source now or later developed that generates a coherent light beam. In one embodiment of the invention, coherent light source 102 is a laser.

The coherent light beam from light source 102 is directed along light path 112 into an optical steering subsystem 104. Optical steering subsystem 104 directs one or more coherent light beams along one or more light paths 114 to holographic storage medium 106. In the write operational mode described further below, at least two coherent light beams are transmitted along two light paths 114 to create an interference pattern in holographic storage medium 106. The interference pattern induces material alterations in storage medium 106 to form a hologram, as described in further detail below.

In the read operational mode, holographically-stored data is retrieved from holographic storage medium 106 by projecting a reconstruction or probe beam along at least one light path 114 into storage medium 106. The hologram and the reconstruction beam interact to reconstruct the data beam which is transmitted along light path 122. The reconstructed data beam is detected by a sensor 110. Sensor 110 may be any type of detector known or used in the art suitable for detecting a coherent light beam, such as a camera, photodetector, and the like.

The light detected at sensor 110 is converted to a signal and transmitted to drive electronics 108 via data line 124. Processor 120 then receives the requested data and/or related information from drive electronics 108 via signal line 118.

Figure 2A:
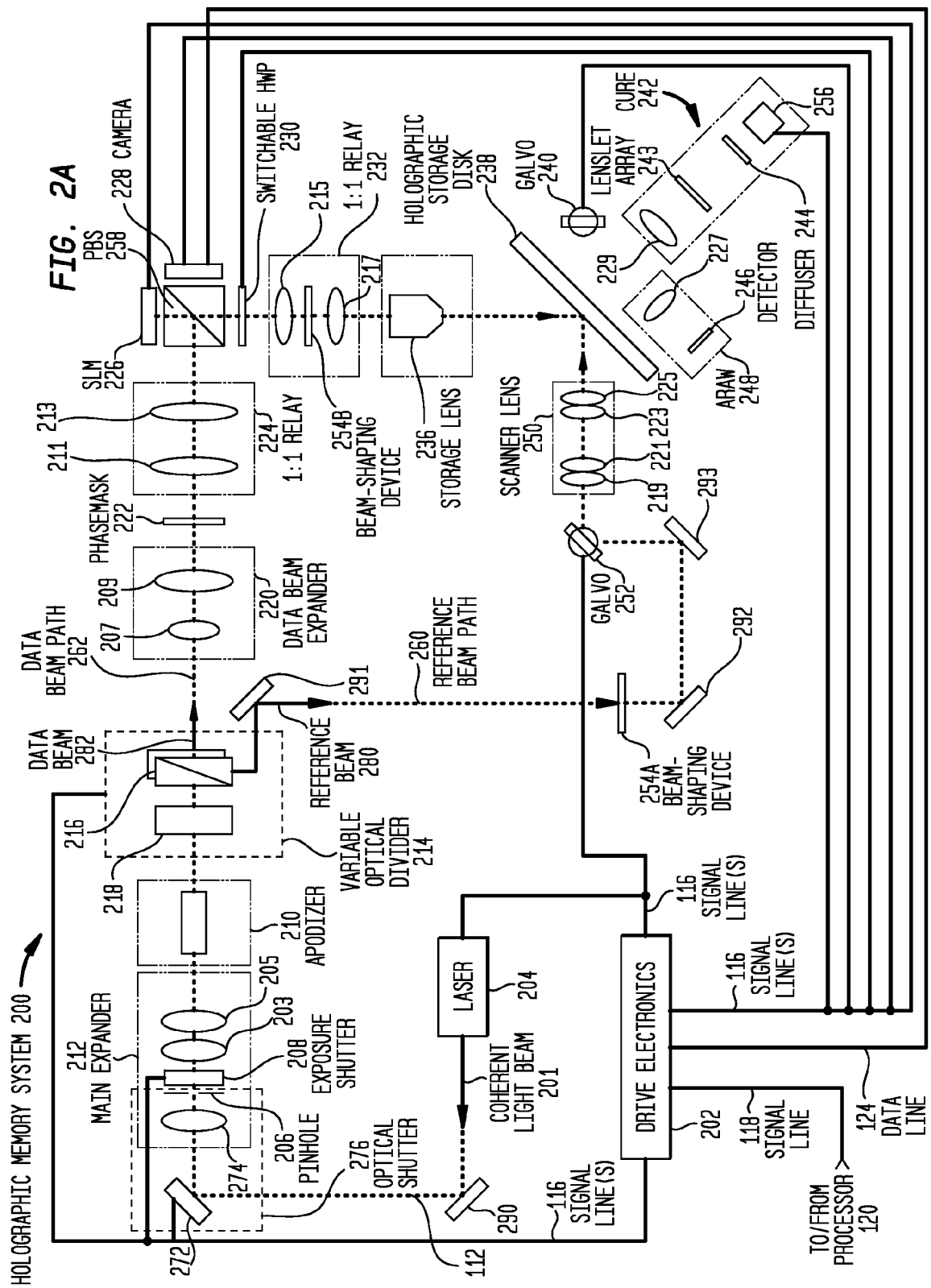
FIG. 2A is an architectural block diagram of the components of a holographic memory system illustrating the optical paths utilized during a write operational mode of the holographic memory system in accordance with one embodiment of the present invention.
Figure 2B:
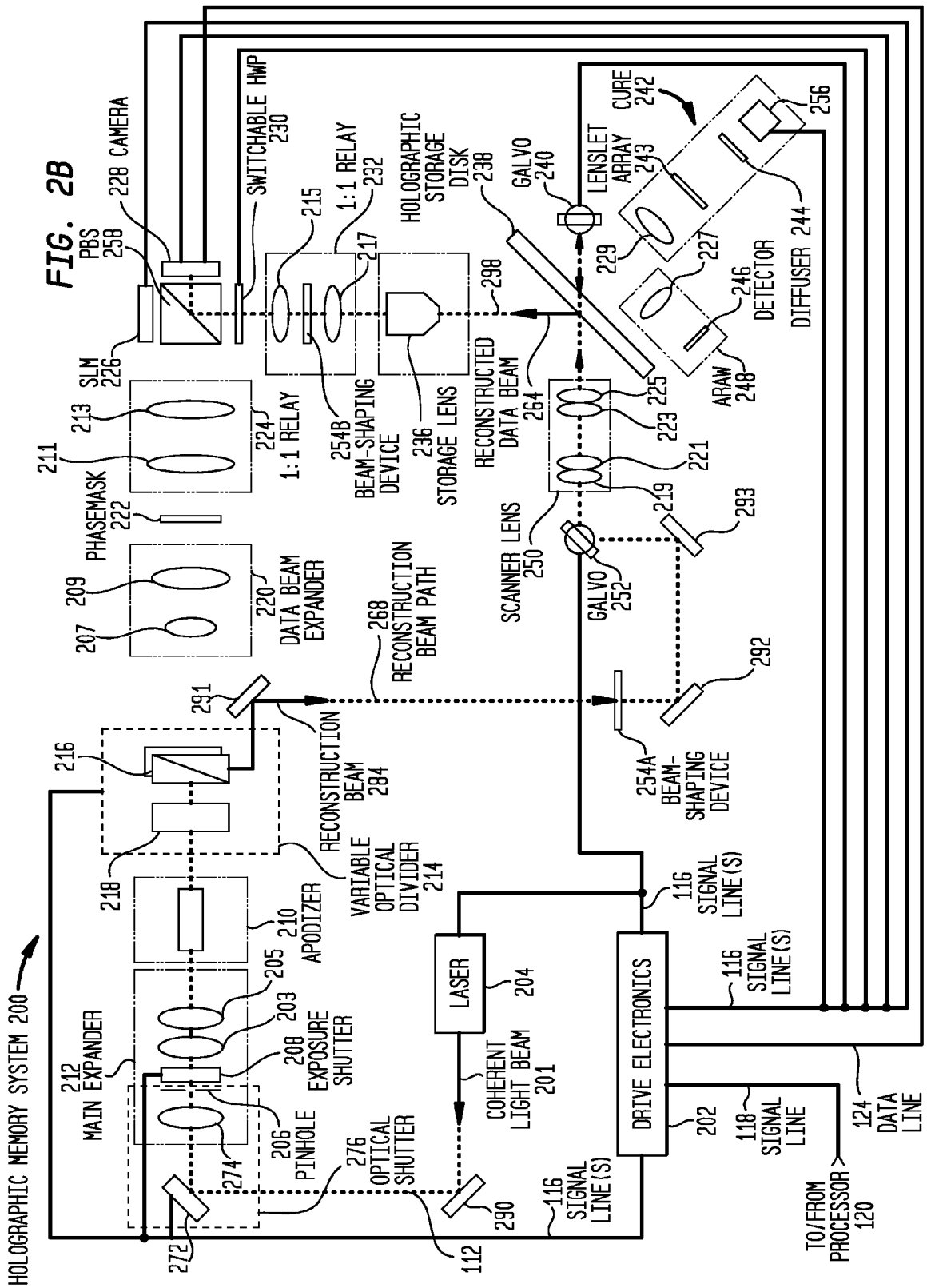
FIG. 2B is an architectural block diagram of the components of a holographic memory system illustrating the optical paths utilized during a read operational mode of the holographic memory system in accordance with one embodiment of the present invention.

A more detailed description of the components of an exemplary embodiment of holographic memory system 100 is presented next below with reference to FIGS. 2A and 2B. This embodiment of holographic memory system 100 is referred to herein as holographic memory system 200. FIGS. 2A and 2B are similar schematic block diagrams of the components of one embodiment of holographic memory system 200 illustrating the optical paths utilized during write and read operations, respectively.

It should be appreciated by those of ordinary skill in the art that the embodiment of optical steering subsystem 104 depicted in FIGS. 2A and 2B is exemplary only and that the holographic memory system in which embodiments of the present invention may be implemented may comprise other components to holographically store data in a photosensitive storage medium. For example, embodiments of the present invention may be implemented in an optical steering subsystem 104 that implements a hologram multiplexing scheme without any moving parts.

Referring to the write mode configuration illustrated in FIG. 2A, coherent light source 102 (FIG. 1) is a laser 204. Laser 204 receives via signal line 116 control signals from an embodiment of drive electronics 108 (FIG. 1), referred to as drive electronics 202. In the illustrated write mode configuration, such a control signal causes laser 204 to generate a coherent light beam 201 which is directed along light path 112, introduced above with reference to FIG. 1.

Coherent light beam 201 is reflected by mirror 290 and is directed through optical shutter 276. Optical shutter 276 comprises beam deviation assembly 272, focusing lens 274 and pinhole 206 that are collectively controllable to shutter coherent light beam 201 from entering the remainder of optical steering subsystem 104.

Coherent light beam 201 passing through optical shutter 276 enters main expander assembly 212. Main expander 212 includes lenses 203 and 205 to expand the light beam to a fixed diameter and to spatially filter the light beam. An exposure shutter 208 within main expander assembly 212 is an electromechanical device that controls recording exposure times.

Upon exiting main expander assembly 212, coherent light beam 201 is directed through an apodizer 210. As is well-known in the art, light emitted from a laser such as laser 204 has a generally Gaussian distribution of light. Apodizer 210 converts the Gaussian beam 201 from laser 204 into a more uniform beam with controlled edge profiles.

After passing through apodizer 210, coherent light beam 201 enters variable optical divider 214. Variable optical divider 214 uses a dynamically-controlled polarization device 218 and at least one polarizing beam splitter (PBS) 216 to redirect coherent light beam 201 into one or more discrete light beams transmitted along two light paths 114 (FIG. 1): light path 260 and light path 262. Variable optical divider 214 dynamically allocates the power of coherent light beam 201 among these discrete light beams 280, 282. In the write operational mode shown in FIG. 2A, the discrete light beam directed along light path 260 is the noted reference light beam, referred to as reference light beam 280 (also referred to herein as reference beam 280), while the discrete light beam directed along light path 262 is the noted data light beam, referred to as data light beam 282 (also referred to herein as data beam 282).

Upon exiting variable optical divider 214, reference beam 280 is reflected by mirror 291 and directed through beam-shaping device 254A positioned in reference path 260. After passing through beam shaping device 254A, reference beam 280 is reflected by mirrors 292 and 293 towards galvo mirror 252. Galvo mirror 252 reflects reference beam 280 into scanner lens assembly 250. Scanner lens assembly 250 has lenses 219, 221, 223 and 225 to pivotally direct reference beam 280 at holographic storage media 106, shown as holographic storage disk 238 in FIGS. 2A and 2B.

Returning attention to variable optical divider 214, data light beam 282 exits the variable optical divider and passes through data beam expander lens assembly 220. Data beam expander 220 implements lenses 207 and 209 to magnify data beam 282 to a diameter suitable for illuminating Spatial Light Modulator (SLM) 226, located further along data beam path 262. Data beam 282 then passes through phasemask 222 to improve the uniformity of the Fourier transform intensity distribution. Data beam 282 is then imaged to SLM 226 via 1:1 relay 224 having lenses 211 and 213, and PBS 258.

SLM 226 modulates data beam 282 to encode information into the data beam. SLM 226 receives the encoding information from drive electronics 202 via a signal line 116. Modulated data beam 282 is reflected from SLM 226 and passes through PBS 258 to a switchable half-wave plate 230. Switchable half-wave plate 230 is used to optionally rotate the polarization of data beam 282 by approximately 90 degrees. A 1:1 relay 232 containing beam-shaping device 254B and lenses 215 and 217 directs data beam 282 to storage lens 236 which produces a filtered Fourier transform of the SLM data inside holographic storage disk 238.

At a particular point within holographic storage disk 238, reference beam 280 and data beam 282 create an interference pattern to record a hologram in holographic storage disk 238.

Holographic memory system 100 further comprises an illuminative curing subsystem 242. Illuminative curing subsystem 242 is configured to provide a uniform curing light beam with reduced coherence to holographic storage disk 238 to pre-cure and/or post-cure a region of the storage medium. Illuminative curing subsystem 242 comprises a laser 256 sequentially aligned with a diffuser 244, a lenslet array 243 and a lens 229. Laser 256 provides a high intensity illuminative curing light beam that is incident on storage disk 238. The light from laser 256 is processed by diffuser 244, lenslet array 243, and lens 229 prior to reaching holographic storage disk 238.

Holographic system 100 additionally comprises an associative read after write (ARAW) subsystem 248. ARAW subsystem 248 is configured to partially verify a hologram soon after the hologram is written to storage medium 106. ARAW subsystem comprises a lens 227 and a detector 246. Holographic system 100 uses ARAW subsystem 248 by illuminating a written hologram with an all-white data page. When a hologram is illuminated by this all-white data page, ARAW subsystem 248 detects the reconstructed reference beam resulting from this all-white illumination. Specifically, detector 246 examines the reconstructed reference beam to verify that the hologram has been recorded correctly.

Referring to the read mode configuration illustrated in FIG. 2B, laser 204 generates coherent light beam 201 in response to control signals received from drive electronics 202. As noted above, coherent light 201 is reflected by mirror 290 through optical shutter 276 that shutters coherent light beam 201 from entering the remainder of optical steering subsystem 104. Coherent light beam 201 thereafter enters main expander assembly 212 which expands and spatially filters the light beam, as described above with reference to FIG. 2A. Upon exiting main expander assembly 212, coherent light 201 is directed through apodizer 210 to convert the Gaussian beam into a more uniform beam.

In the arrangement of FIG. 2B, when coherent light beam 201 enters variable optical divider 214, dynamically-controlled polarization device 218 and PBS 216 collectively redirect the coherent light beam into one discrete light beam 114, referred to as reconstruction beam 284. Reconstruction data beam 284 travels along reconstruction beam path 268, which is the same path 260 traveled by reference beam 280 during the write mode of operation, described above with reference to FIG. 2A.

A desired portion of the power of coherent light beam 201 is allocated to this single discrete light beam based on the selected polarization implemented in device 218. In certain embodiments, all of the power of coherent light beam 201 is allocated to reconstruction light beam 284 to maximize the speed at which data may be read from holographic medium 238.

Upon exiting variable optical divider 214, reconstruction beam 284 is directed by mirror 291 through beam-shaping device 254A.

After passing through beam-shaping device 254A, reconstruction beam 284 is directed to scanner lens 250 by mirrors 292 and 293, and galvo mirror 252. Scanner lens assembly 250 pivots reconstruction beam 284 at a desired angle toward holographic storage disk 238.

During the read mode, reconstruction beam 284 passes through holographic storage disk 238 and is retro-reflected back through the medium by a galvo mirror 240. As shown in FIG. 2B, the data reconstructed on this second pass through storage disk 238 is directed along reconstructed data beam path 298 as reconstructed data beam 264.

Reconstructed data beam 264 passes through storage lens 236 and 1:1 relay 232 to PBS 258, all of which are described above with reference to FIG. 2A. PBS 258 reflects reconstructed data beam 264 to an embodiment of sensor 110 (FIG. 1), here a camera 228. The light detected by camera 228 is converted to a signal and transmitted to drive electronics 202 via signal line 124, introduced above with reference to FIG. 1. Processor 120 then receives the requested data and/or related information from drive electronics 202 via signal line 118.

Embodiments of the position tracking module of the present invention will now be described in detail with reference to an exemplary holographic memory system illustrated in FIGS. 3A-11. In the embodiments illustrated in FIGS. 3A-11, an encoded object is referred to as a holographic storage disk 238.

Figure 3A:
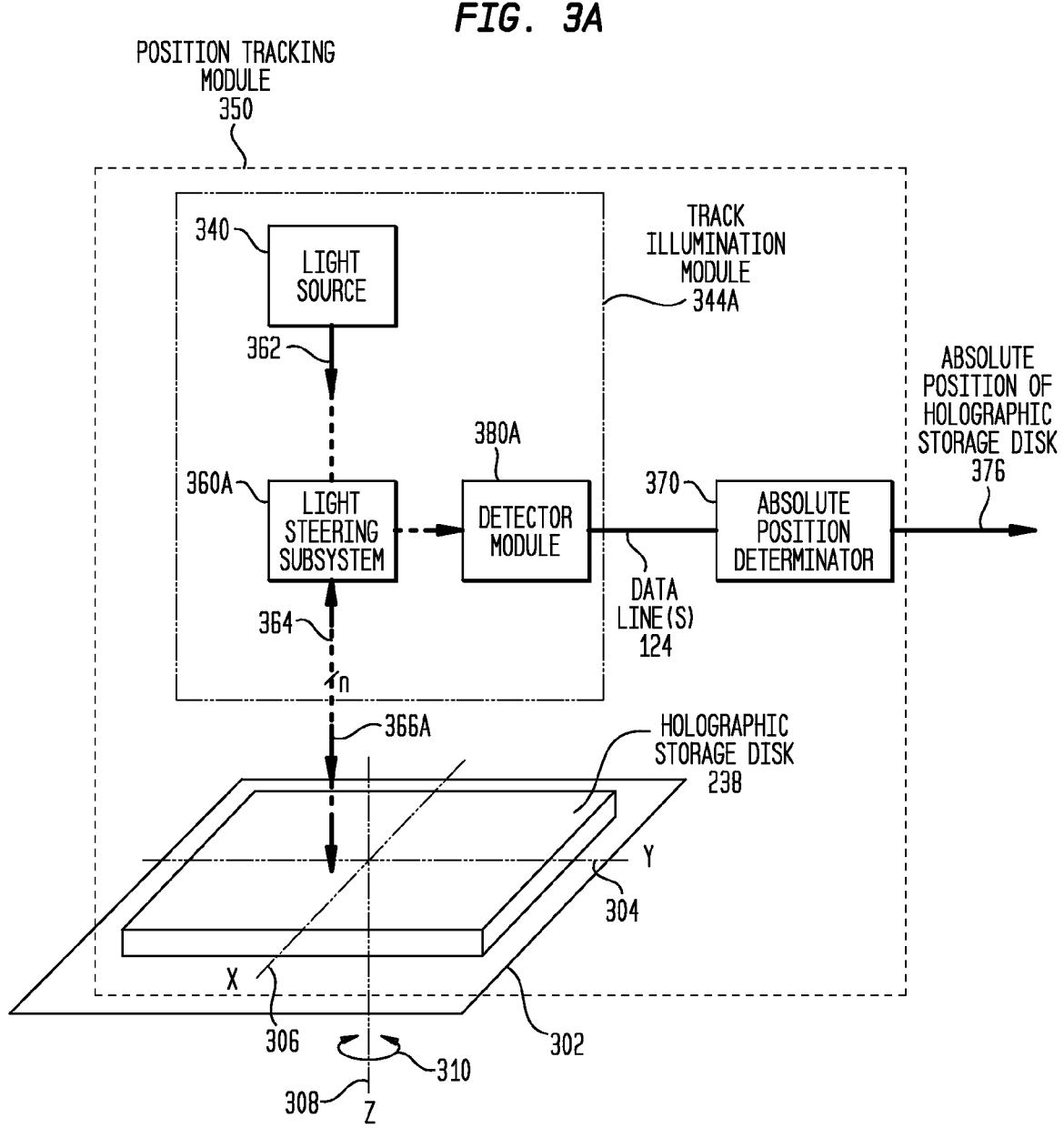
FIG. 3A is a functional block diagram of components of a position tracking module as may be implemented in a holographic memory system such as that illustrated in FIGS. 1, 2A, and 2B, in accordance with one embodiment of the present invention.

FIGS. 3A and 3B are functional block diagrams of components of a position tracking module as may be implemented in a holographic memory system such as that illustrated in FIGS. 1, 2A and 2B, to determine the absolute position of holographic storage disk 238. As shown in FIGS. 3A and 3B, holographic storage disk 238 is positioned to lie in an ideal imaginary plane. This is illustrated FIGS. 3A and 3B as a rectangular portion of storage disk 238 lying in a plane 302. Plane 302 is defined by orthogonal X- and Y-axes 306, 304. Orthogonal to plane 302 is a Z-axis 308. When holographic storage disk 238 is positioned in holographic memory system 200, the storage disk 238 rotates within plane 302 about Z-axis 308, as shown by arrow 310 to enable the system to perform read, write and other operations with the storage disk. In such embodiments, holographic storage disk 238 is typically a round disk. In other embodiments, holographic storage disk 238 would translate along the X- or Y-axis 306, 308 during normal operations. In these embodiments, holographic storage disk 238 is typically a square storage disk.

As noted, position tracking module 350 is configured to sense the absolute position of an encoded object such as a holographic storage medium which, in the context of holographic memory system 200, is a holographic storage disk 238. The term "absolute position" as used herein refers to the position of holographic storage disk 238 within plane 302. As a result, embodiments of position tracking module 350 detect translation and/or rotation of holographic storage disk 238 within plane 302. By determining the position of holographic storage disk 238 within plane 302, holographic memory system 200 can quickly and accurately determine where to write to and/or read from holographic storage disk 238, as well as determine the correct position for performing various other operations.

Referring to FIG. 3A, position tracking module 350 comprises a track illumination module 344A and an absolute position determinator 370. Track illumination module 344A comprises a light source 340, a light steering subsystem 360A and a detector module 380A. Light source 340 generates a light beam 362. In this particular application of a holographic memory system, light beam 362 is at least a partially coherent light beam. Light steering subsystem 360A is disposed between light source 340 and holographic storage disk 238, and is configured to direct coherent light beam 362 towards holographic storage disk 238. Light steering subsystem 360A forms coherent light beam 362 into one or more coherent light beams 366A each of which is transmitted along a corresponding one or more optical path(s) 364.

The one or more light beams 366A traveling along optical path(s) 364 are incident upon holographic storage disk 238, and is/are at least partially reflected by holographic storage disk 238 back towards light steering subsystem 360A. Light steering subsystem 360A directs the reflected light beam(s) to detector module 380A. In alternative embodiments, the light beam is reflected from holographic storage disk 238 are not reflected back through light steering subsystem 360A. Rather, the light beam is reflected at an angle from holographic storage disk 238 directly to detector module 380A.

The light pattern detected at detector module 380A is converted to a signal which is relayed via data line 124 to absolute position determinator 370. Absolute position determinator 370 is configured to detect the absolute position of holographic disk 238 based on the light reflection pattern (described below) at detector module 380. Absolute position determinator 370 generates a signal 376 representing the absolute position of holographic storage disk 238 for use by other components of holographic memory system 200. Details of the above elements of track illumination module 344A are provided below.

Referring to FIG. 3B, position tracking module 350 comprises a track illumination module 344B and an absolute position determinator 370. Track illumination module comprises a coherent light source 340, a light steering subsystem 360B and a detector module 380B.

As described above with reference to FIG. 3A, light source 340 generates a coherent light beam 362. Light steering subsystem 360A is disposed between light source 340 and holographic storage disk 238, and is configured to direct coherent light beam 362 towards holographic storage disk 238. Light steering subsystem 360A forms coherent light beam 362 into one or more coherent light beams 366A each of which is transmitted along a corresponding one or more optical path(s) 364.

In the embodiment illustrated in FIG. 3B, the light beam(s) traveling along optical path 364 are at least partially transmitted by holographic storage disk 238. This transmitted light beam 378 is then incident on detector module 380B. The light pattern detected at detector module 380B is converted to a signal and relayed to absolute position determinator 370. Absolute position determinator 370 is configured to detect the absolute position of holographic disk 238 based on the light transmission at detector module 380.

It would be appreciated that light sources other than a laser could be used in embodiments of the present invention. For example, light source 340 could be any source that generates a light beam with minimal coherence suitable for use in the particular embodiment of detector module 380. Furthermore, it would be appreciated that it is an advantage of the present invention that a light source having less coherency and power requirements than the light sources used in the read, write and other operational modes may be used as light source 340 in track illumination module 344.

Although embodiments of the present invention are described with reference to a track illumination module 344, it would be appreciated that the components and function of track illumination module may be implemented in various other forms including other combinations of software and/or hardware. In the above embodiment a single light source 340 is utilized to generate a source light beam 362 which is then formed by the light steering subsystem 360A into one or more light beams 366A. It should be appreciated, however, that in alternative embodiments multiple light sources 340 may be used, each generating a source light beam 362 which is formed into one or more of the light beams 366A.

FIG. 4 is a high level flowchart in accordance with one embodiment of the present invention. In accordance with embodiments of the present invention, at block 402, holographic memory system 200 receives an encoded holographic storage disk 238. Details of encoded holographic storage disk 238 are provided below with reference to FIGS. 5 and 6.

At block 404, holographic memory system 200 illuminates holographic storage disk 238 with one or more light beams.

At block 406, the reflected or transmitted light resulting from the illumination of holographic storage disk 238 with the one or more light beams is detected at a detector module.

At block 408, based on the reflection or transmission of the one or more light beams, an absolute position detector determines the absolute position of holographic storage disk 238

Figure 5:
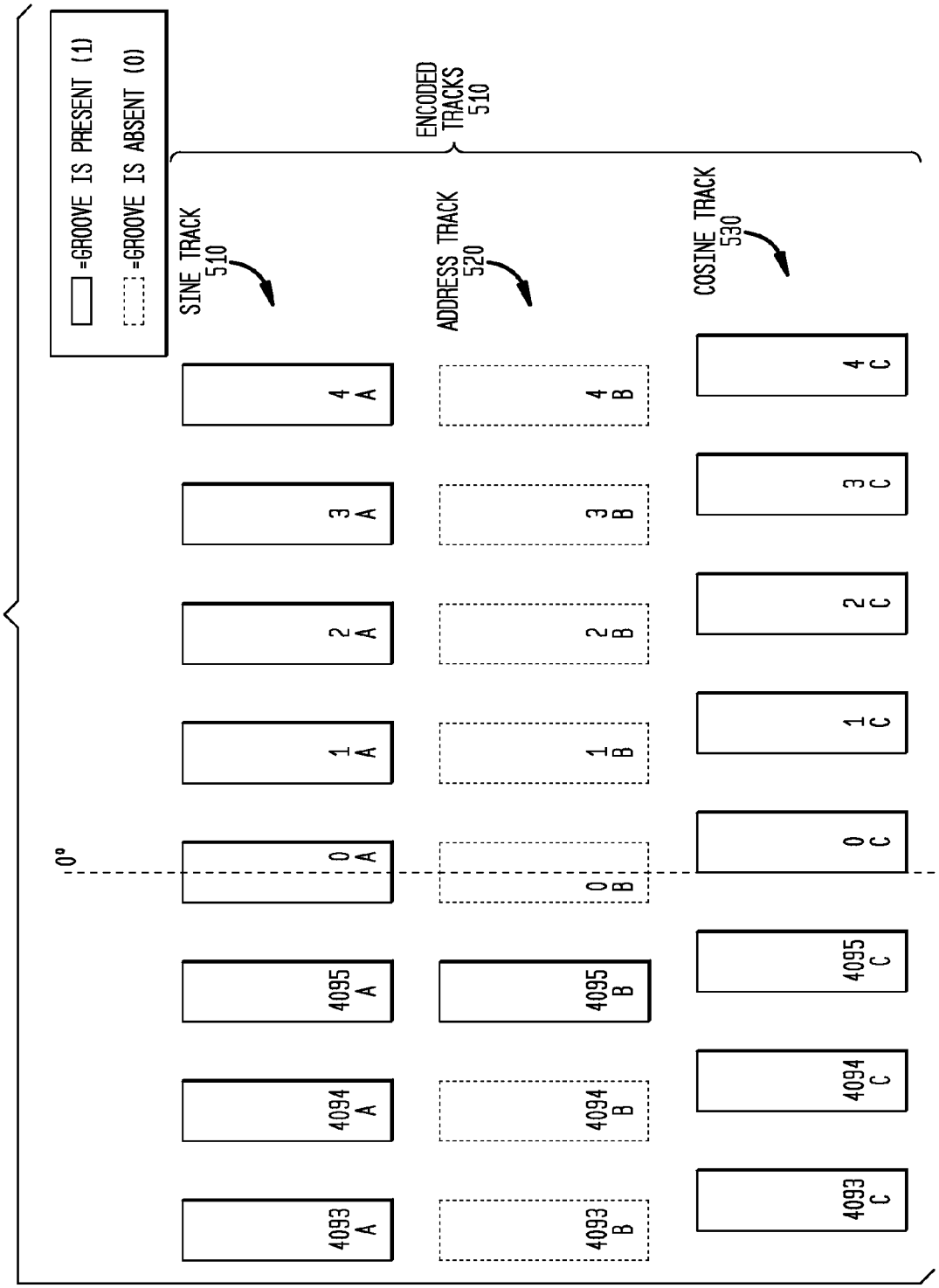
FIG. 5 is an enlarged schematic diagram illustrating a small segment of an encoded holographic storage disk in accordance with embodiments of the present invention.

FIG. 5 is an enlarged schematic diagram illustrating a small segment of an encoded pattern on a holographic storage disk in accordance with one embodiment of the present invention. As noted above, the absolute position of holographic storage disk 238 is sensed by illuminating tracks on the disk. In one embodiment, these tracks comprise two quadrature tracks 510, 530 and one address track 520 each embossed into holographic storage disk 238. The embossing may consist of any method that creates an optical path difference between embossed and unembossed regions such as that introduced by etching. In the embodiment described herein, the tracks are etched into holographic storage disk 238 using any etching technique now or later developed. As such, the etching technique is not described further herein.

Referring first to quadrature tracks 510, 530, illumination of these tracks results in the reconstruction of sinusoidal curves. Illumination of track 510 results in the reconstruction of a sine curve. As such, track 510 is referred to herein as sine track 510. Illumination of track 530 results in the reconstruction of a cosine curve. As such, track 530 is referred to herein as cosine track 530.

Tracks 510 and 530 comprise an etched pattern of alternating grooves and mesas. Etched grooves are shown in FIG. 5 as dark rectangles while mesas are shown in FIG. 5 as the areas between these rectangles. As illustrated, cosine track 530 is etched so as that the reconstructed cosine curve from track 530 is shifted 90 degrees from the reconstructed sine curve from track 510. The reconstruction and functions of the quadrature tracks are described below with reference to FIG. 11.

Address track 520 is a pseudo-random pattern of etched grooves and mesas. Etched grooves are shown in FIG. 5 as dark rectangles while the dotted rectangles indicate a position where a groove is absent. Address track 520 is aligned with sine track 510.

As one of ordinary skill will find apparent, the detected change in absolute position (translation and/or rotation) is based on the configuration of tracks 590 on the object. That is, linear tracks are utilized to detect translational changes in absolute position parallel to such tracks. Similarly, circular tracks are utilized to detect rotational changes in absolute position of the object.

Figure 6:
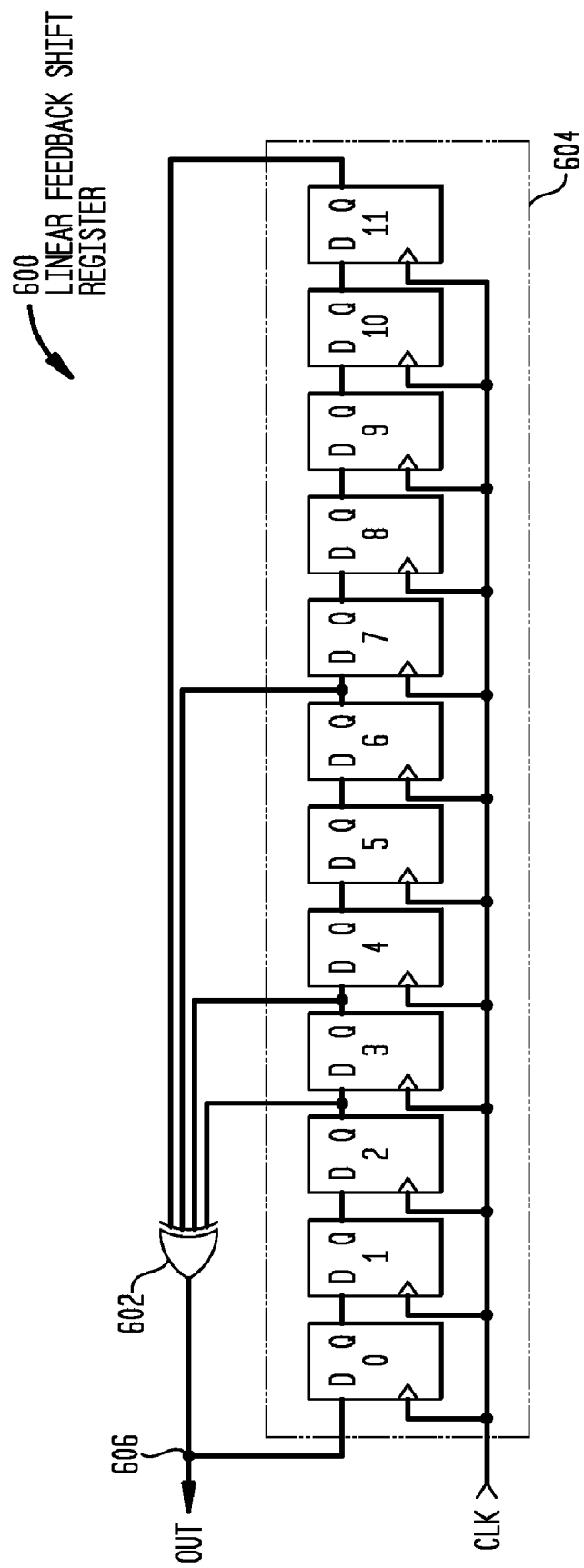
FIG. 6 is an architectural block diagram of an LFSR used to generate the pattern used to encode portions of a holographic storage disk in accordance with embodiments of the present invention.

The pseudo-random pattern of address track 520 is determined in one embodiment by a linear feedback shift register (LFSR). FIG. 6 is a schematic diagram of one embodiment of an LFSR 600 used to generate the pattern used to encode portions of holographic storage disk 238.

LFSR 600 is composed of a serial configuration of n D flip-flops 604 and an XOR gate 602. The next state of the LFSR 600 is a function of its current state shifted by 1 bit. As such, two adjacent states generated by LFSR 600 share n−1 bits, wherein n equals the number of flip-flops used in the LFSR, and any n bit subsequence of the output sequence represents an n bit state of the LFSR. The number of pseudo-random states generated by the LFSR equals $(2^n-1)$ provided that the XOR function is selected to effect division by a primitive polynomial. Thus, the LFSR will cycle through all $(2^n-1)$ possible non-zero states exactly once per $(2^n-1)$ clock cycles, and every n bit non-zero state will appear exactly once as a subsequence of the $(2^n-1)$ bit output sequence when it is treated as a circular (wrapping) sequence. Furthermore, the circular $(2^n-1)$ bit output sequence will contain exactly one subsequence of exactly n−1 zeros in a row. If another zero is inserted into this subsequence, then the resulting $2^n$ bit circular sequence will contain every possible n bit subsequence exactly once, including the n-zeros subsequence. General aspects of LFSRs are known in the art and will not be described in further detail. In the embodiment shown in FIG. 6, the serial configuration of D flip-flops 604 comprises 12 D flip-flops. Thus, in this embodiment, n equals 12 and LFSR 600 will produce a pseudo-random pattern having ($2^n$−1), or 4095 different unique n bit subsequences. In another embodiment, a zero is inserted to produce a pseudo-random pattern having $2^n$, or 4096 different unique n bit subsequences.

Initialization of LFSR 600 is performed by loading the whole LFSR from an initialization register, or possibly by using reset and preset inputs into the flip-flops. In alternative embodiments, LFSR 600 may be implemented partially or wholly in software.

Figure 7:
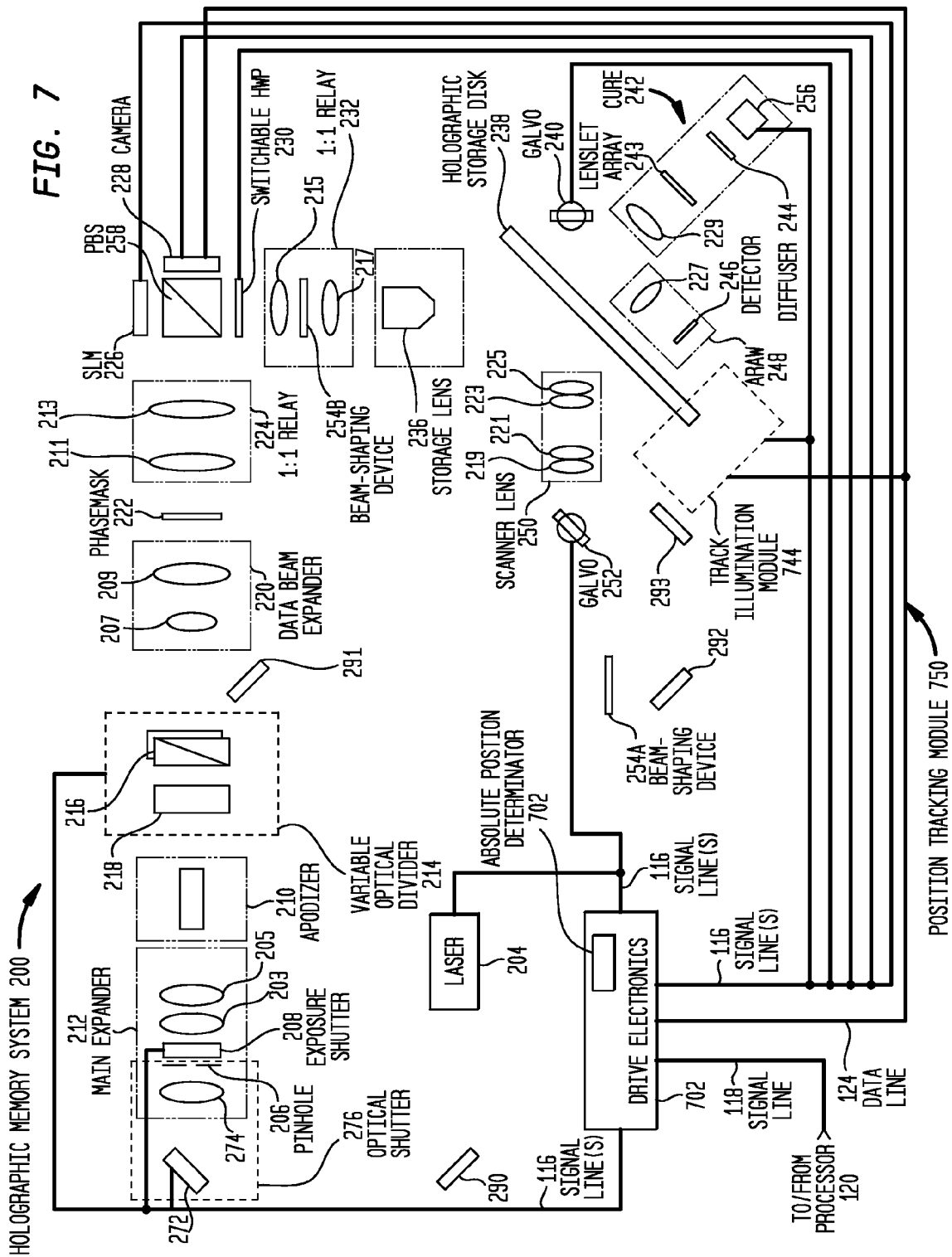
FIG. 7 is an architectural block diagram of the components of a holographic memory system illustrating the location of a position tracking module in accordance with one embodiment of the present invention.

FIG. 7 is an architectural block diagram of the components of holographic memory system 200 illustrating the location of a position tracking module in accordance with one embodiment of the present invention. Position tracking module 750 operates simultaneously with other operational modes of holographic memory system 200 and is thus positioned so as not to interfere with other drive operations. In the embodiments shown in FIG. 7, the light paths corresponding to other operational modes as discussed above have been removed for clarity. It would be appreciated by one of ordinary skill in the art that position tracking module 750 may be place in other locations within holographic memory system 200.

FIG. 8 is an enlarged functional block diagram of the components of one embodiment of position tracking module 350, introduced above with reference to FIG. 3A. As noted, position tracking module 350 comprises a track illumination module 344A and an absolute position detector 370. In accordance with the embodiment illustrated in FIG. 8, track illumination module 344A comprises a coherent light source 840, a light steering subsystem 360A, and a detector module 380A.

Light source 840 comprises a laser and is referred to as laser 840. Laser 840 generates a coherent light beam 830 directed towards holographic storage disk 238. Light beam 830 enters light steering subsystem 360A positioned between laser 840 and holographic storage disk 238. Light steering subsystem 360A comprises a lens 842, a grating 844, a polarizing beam splitter (PBS) 846 and a quarter wave plate 856 sequentially aligned along a single light path, here a light path between laser 840 and holographic storage disk 238.

In some embodiments, lens 842 is positioned between laser 840 and grating 844 in the path of coherent light beam 830. Lens 842 is positioned such that portions of coherent light beam 830 incident on holographic storage disk 238 will be focused coherent beam spots.

It would be appreciated by one of ordinary skill in the art that lens 842 could be positioned in the path of coherent light beam 830 after grating 844. Similarly, it would be appreciated by one of ordinary skill in the art that track illumination module 344A may also operate without lens 842 positioned in light steering subsystem 360A. In said embodiment, the portions of coherent light beam 830 incident on holographic storage disk 238 would not be focused beam spots.

Coherent light beam 830 leaving lens 842 then impinges on grating 844. Grating 844 is a diffractive grating that forms or diffracts coherent light beam 830 into one or more coherent light beams 832 directed towards holographic storage disk 238. In the illustrated embodiment in which a plurality of coherent light beams 832 are desired, grating 844 diffracts (i.e., forms or divides) coherent light beam 830 into that quantity of coherent light beams 832. For example, in the embodiments herein, grating 844 diffracts coherent light beam 830 into three coherent light beams 832. Grating 844 also allocates the power of light beam 830 between coherent light beams 832, as is well-known in the art.

Coherent light beams 832 are then incident on PBS 846. The polarization orientation of coherent light beams 832 are such that PBS 846 will substantially passes through or transmits the light beams.

Coherent light beams 832 leaving PBS 846 then pass through quarter wave plate 856 positioned in the path of coherent light beams 832 prior to illuminating holographic storage disk 238. Quarter wave plate 856 is configured to rotate the polarization orientation of coherent light beams 832 by approximately 45 degrees.

After leaving quarter wave plate 856, coherent light beams 832 are incident on holographic storage disk 238. The diffraction caused by diffractive grating 844 causes each beam 832 to illuminate one of the encoded tracks 510, 520, 530 on holographic storage disk 238.

In the embodiment shown in FIG. 8, laser 840 and holographic storage disk 238 are configured such that a substantial portion of light beams 832 will be reflected from encoded tracks 590. The light beams 870 reflected from the encoded tracks 590 of holographic storage disk 238 are collectively referred to as reflected light beams 870. Reflected light beams 870 are reflected back through quarter wave plate 856 to PBS 846. As a result of traveling through quarter wave plate a second time, reflected light beams 870 each have a polarization orientation that is rotated 90 degrees from coherent light beam 830.

As is well known in the art, a PBS will substantially transmit light beams of a particular polarization orientation and will substantially reflect light beams of an orthogonal polarization orientation. Because PBS 846 is configured to substantially pass through coherent light beams 832 leaving grating 844, PBS 846 substantially reflects beams 870 towards detector module 380A. The light beams reflected from PBS 846 toward detector module 380A are referred to herein as light beams 878.

In the illustrated embodiment, detector module 380A comprises a lens 858 and a detector 848. Detector 848 comprises a multiple element detector. In certain embodiments, detector 848 is a six-element detector as described in detail below with reference to FIG. 10. Lens 858 is positioned in the path of reflected coherent light beams 878 between PBS 846 and detector 848. Lens 858 is preferably a cylindrical lens configured to direct reflected coherent light beams 834 so that each of the reflected coherent light beams is incident on a different single pair of detector elements in detector 848.

As would be appreciated by one of ordinary skill in the art, track illumination module 744A may operate without lens 858. Lens 858 is useful in embodiments in which grating 844 produces a smaller angular separation between coherent light beams 832. Grating 844 is configured to produce such a smaller angular separation in embodiments in which it is desirable to route light beams 832 and 870 in relative close proximity to one another.

Light beams 878 leaving lens 858 are incident on detector 848 and each pair of elements of the detector observes a diffraction pattern. Detector 848 provides the results of the diffraction patterns to absolute position determinator 370. As noted, details of detector 848 and absolute position determinator 370 are described below with reference to FIGS. 10 and 11.

Throughout this application, the term polarizing beam splitter (PBS) refers to any device configured to direct an incident light beam in a direction based on the polarization of the incident light beam. For example, embodiments of a PBS used in accordance with present invention may be a polarizing beam splitter cube, a thin film polarizer, a plate polarizer, a prism made of certain materials such as calcite, a customized prism, and other devices now or later developed.

It should also be understood that light steering subsystem 360 may be configured to direct light beams 832 toward holographic storage disk 238 at a desired angle. In such an embodiment, reflected light beams 870 would be directed directly toward detector module 380A. As a result, light steering subsystem 360A would not require PBS 846 and quarter wave plate 856. It should also be appreciated by one of ordinary skill in the art, beam splitters may be used in place of grating 844 to form one or more light beams 832.

Figure 9:
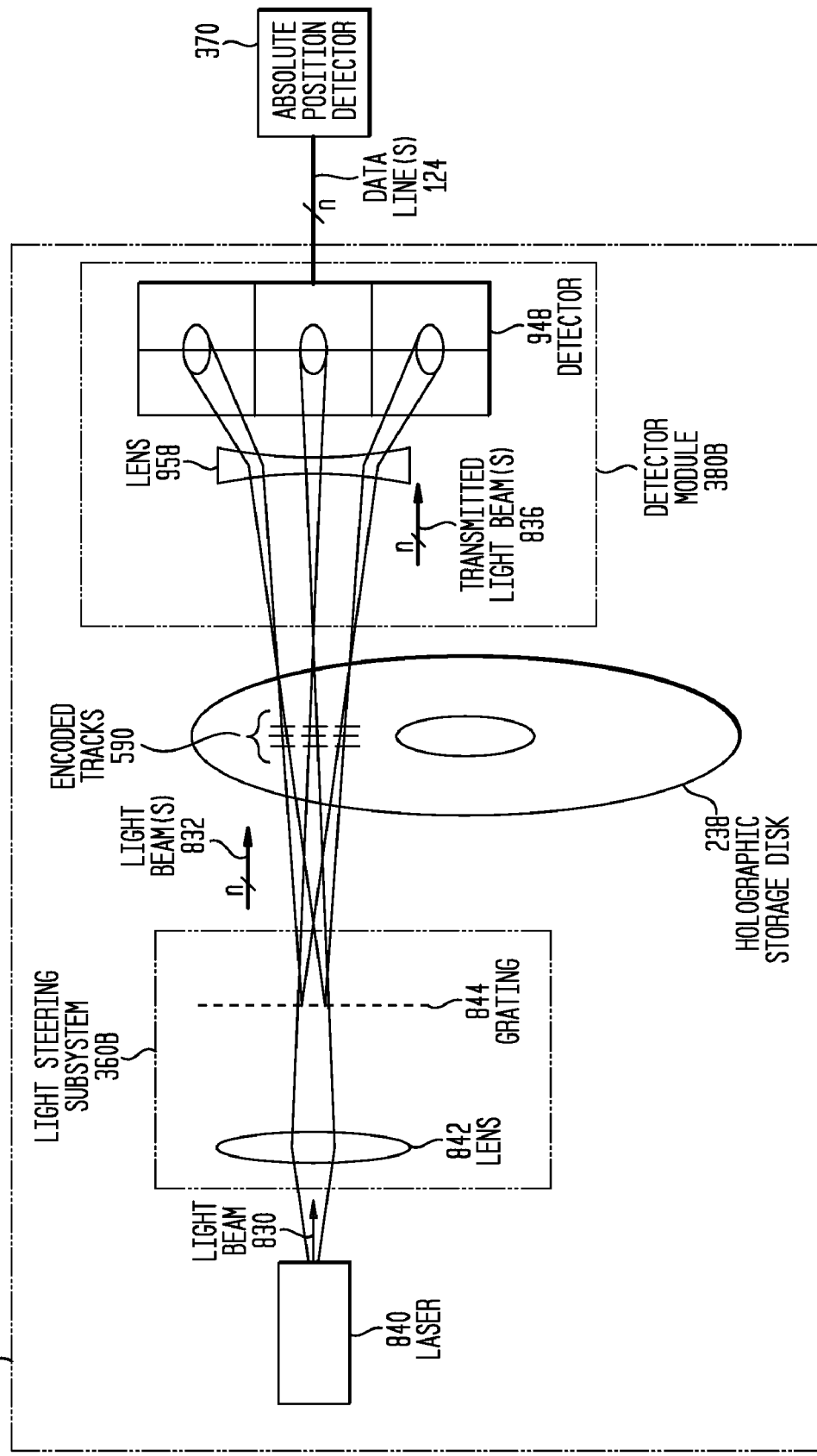
FIG. 9 is an enlarged functional block diagram of the components of a position tracking module in accordance with the embodiments of the present invention illustrated in FIG. 3B.

FIG. 9 is an enlarged functional block diagram of the components of one embodiment of a position tracking module 344B introduced above with reference to FIG. 3B. As noted above, position tracking module 350 comprises a track illumination module 344B and an absolute position detector 370. In accordance with the embodiment illustrated in FIG. 9, track illumination module 344B comprises a laser 840, a light steering subsystem 360B, and a detector module 380B.

Laser 840 generates a coherent light beam 830 directed towards holographic storage disk 238. Light beam 830 enters light steering subsystem 360B positioned between laser 840 and holographic storage disk 238. Light steering subsystem 360B comprises a lens 842 and a grating 844 sequentially aligned between laser 840 and holographic storage disk 238.

In some embodiments, lens 842 is positioned between laser 840 and grating 844 in the path of coherent light beam 830. Lens 842 is positioned such that portions of coherent light beam 830 incident on holographic storage disk 238 will be focused coherent beam spots.

It would be appreciated by one of ordinary skill in the art that lens 842 could be positioned in the path of coherent light beam 830 after grating 844. Similarly, it would be appreciated by one of ordinary skill in the art that track illumination module 344B may also operate without lens 842 positioned in light steering subsystem 360B. In said embodiment, the portions of coherent light beam 830 incident on holographic storage disk 238 would not be focused beam spots.

Coherent light beam 830 leaving lens 842 then impinges on grating 844. Grating 844 is a diffractive grating that diffracts coherent light beam 830 into one or more coherent light beams 832 directed towards holographic storage disk 238. In the illustrated embodiment, grating 844 diffracts or divides coherent light beam 830 into three coherent light beams 832. Grating 844 also allocates the power of light beam 830 between coherent light beams 832, as is well-known in the art.

After leaving grating 844, coherent light beams 832 are incident on holographic storage disk 238. The diffraction caused by diffractive grating 844 causes each beam to illuminate one of the encoded tracks on holographic storage disk 238 described above with reference to FIG. 5.

In the embodiment shown in FIG. 9, laser 840 and holographic storage disk 238 are configured such that a substantial portion of light beams 832 will be transmitted by holographic storage disk 238 through encoded tracks 590. The light beams transmitted through the encoded tracks 590 of holographic storage disk 238 are collectively referred to as transmitted light beams 836. Transmitted light beams 836 are incident on detector module 380B.

In the illustrated embodiment, detector module 380B comprises a lens 958 and a detector 948. Lens 958 is positioned in the path of transmitted coherent light beams 836 between holographic storage disk 238 and detector 948. Detector 948 comprises a multiple element detector. In embodiments of the present invention, detector 948 is six-element detector as described in detail below with reference to FIG. 10. Lens 958 is configured to direct transmitted coherent light beams 836 so that each of the transmitted coherent light beams is incident on a different single pair of detector elements in detector 948. In the illustrative embodiments, lens 958 is a concave lens, although other lens may be implemented in alternative embodiments.

As would be appreciated by one of ordinary skill in the art, track illumination module 344B could operate without lens 858. Lens 858 is useful, for example, in embodiments in which grating 844 produces a smal angular separation between coherent light beams 832. Grating 844 is configured to produce such a smal angular separation in embodiments in which it is desirable to route light beams 832 and 836 in relative close proximity to one another.

Light beams 836 leaving lens 958 are incident on detector 948 and each pair of elements of the detector observes a diffraction pattern. Detector 948 relays the results of the diffraction patterns to absolute position determinator 370. As noted, details of detector 948 and absolute position determinator 370 are described below with reference to FIGS. 10 and 11.

Figure 10:
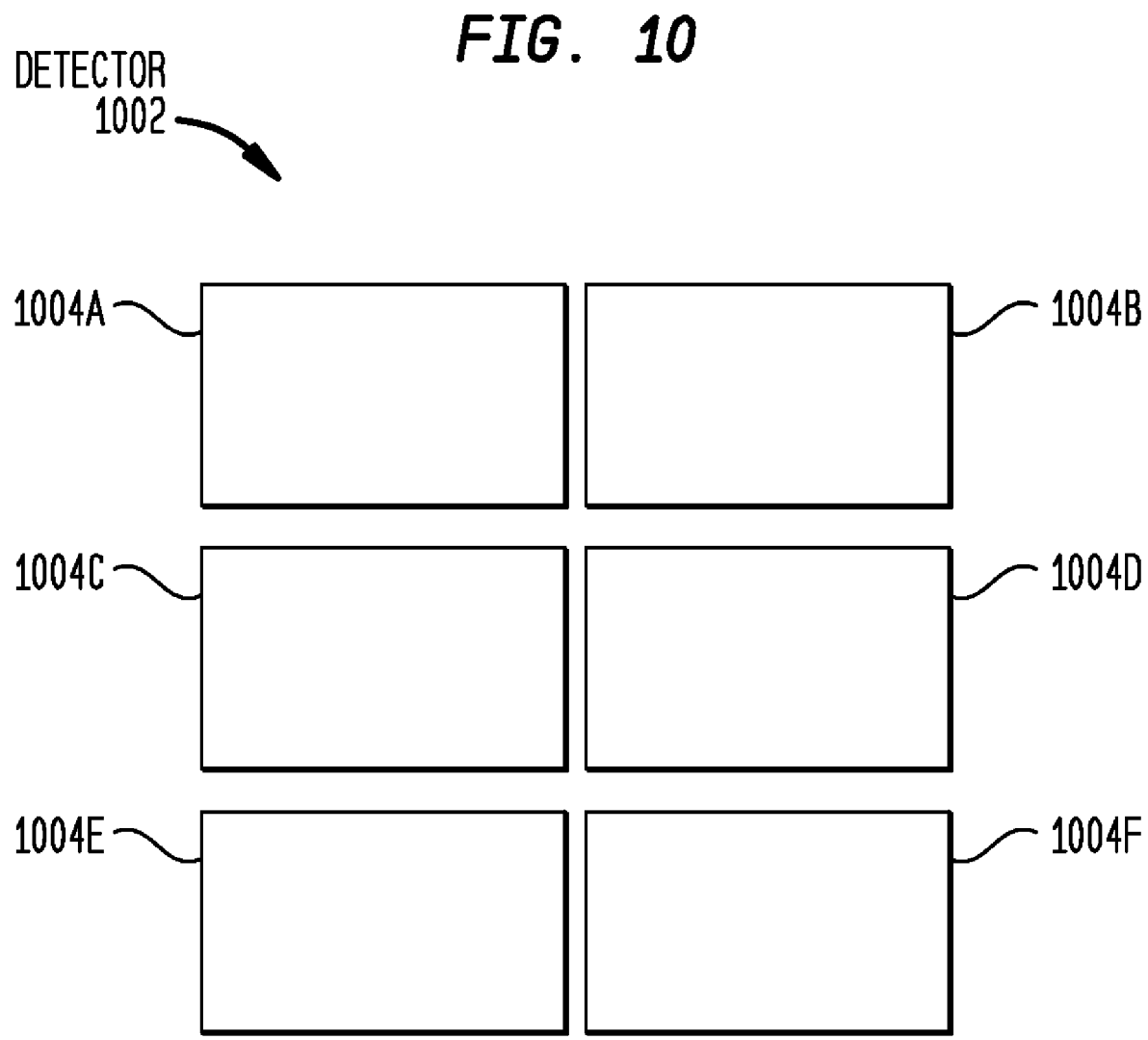
FIG. 10 is an enlarged block diagram illustrating a detector used in embodiments of the present invention.

FIG. 10 is an enlarged block diagram illustrating a detector used in embodiments of the present invention, referred to herein as detector 1002. Detector 1002 is a six-element detector comprising a 3×2 array of detector elements 1004. The light beam reflected/transmitted by one encoded track 590 (FIG. 5) on holographic storage disk 238 is incident on a single pair of parallel detector elements in detector 1002.

When each of the encoded data tracks 590 are illuminated with a light beam, each track 590 causes a diffraction pattern at a different pair of parallel detector elements 1004, and provides a signal to absolute position determinator 370 based on the diffraction pattern, as described below with reference to FIG. 11.

It would be appreciated by one of ordinary skill in the art that detector 1002 may comprise more or less detector elements 1004. Detector 1002 may use a single detector element 1004 to detect the light reflected from each track 510, 520, 530. For example, detector elements 1004 may be position-sensitive detector element such as a lateral-effect photodiode that detects light reflected from a single track 510, 520, 530. It should be appreciated that other types of detector elements may be utilized in such embodiments depending on cost and desired accuracy. Similarly, detector 1002 may use more detector elements 1004 to detect a diffraction signal, such as in a CCD detector array.

Figure 11:
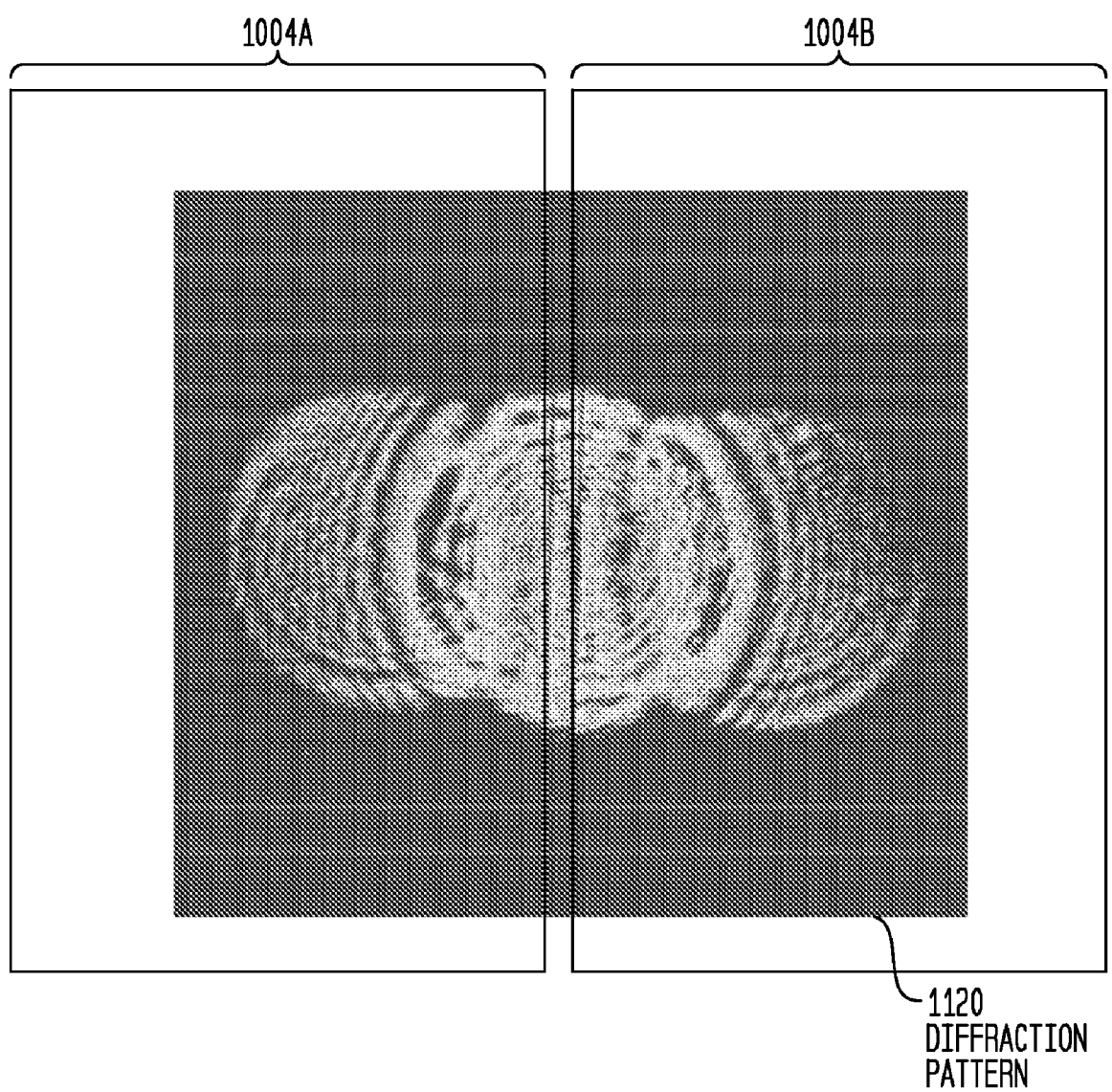
FIG. 11 is an enlarged block diagram illustrating the diffraction pattern observed by the detector illustrated in FIG. 10 in accordance with embodiments of the present invention.

FIG. 11 is diagram illustrating the diffraction pattern observed by an exemplary pair (1004A, 1004B) of detector elements 1004 illustrated in FIG. 10 in accordance with embodiments of the present invention.

The light from one of the three encoded tracks 510, 520, 530 is reconstructed using a push-pull detection method. Push-pull detection in accordance with embodiments of the present invention occurs when a focused coherent light beam is reflected by/transmitted through track on a medium. The reflected/transmitted light is then detected in the far field. The tracks cause the incident beam to be diffracted into different orders. A split detector positioned at the far field detects the interference pattern between the directly reflected beam ($0^{th}$ order) and the components diffracted by the tracks (+/−1 orders).

More specifically, as described above, in accordance with embodiments of the present invention, a holographic storage disk 238 having etched tracks 590 thereon (FIG. 5) is illuminated with one or more light beams 832 (FIGS. 8 and 9). Etched tracks 590 cause various portions of the reflected/ transmitted light beams to experience different optical path lengths prior to impinging on detectors 848 (FIG. 8) and 948 (FIG. 9).

In the case of the reflection embodiment illustrated in FIG. 8, the different optical path lengths result from the fact that the portions of a coherent light beam incident on a groove must travel through a longer optical path than the portions that are incident on a mesa. However, in the case of the transmission embodiment illustrate in FIG. 9, the different optical path lengths results from the fact that portions of a coherent light beam incident on a mesa must travel farther than the portions incident on a groove. These different optical path lengths traveled by the portions of coherent light beams reflected/transmitted by a groove than the light reflected/transmitted by a mesa causes the diffraction in the far field.

Moreover, as a focused coherent light beam spot scans across a track, the shifting of a groove relative to the focused spot causes a linear phase rotation in the far Fourier plane of the diffracted components. The phase of the undiffracted component (the $0^{th}$ order) is unaffected. The shift induced phase rotation causes the interference between the diffracted and undiffracted components to become increasingly constructive on one side of the photodetector, whereas it becomes increasingly destructive on the opposite side. Thus, the detector positioned in the far field detects an intensity differential that is proportional to the position of the pit relative to the focused spot.

This intensity differential observed at each pair of detector elements in detectors 848, 948 is converted to a signal and relayed to absolute position determinator 370 via data lines 124. The diffraction observed from each of the tracks results in a different piece of information being relayed to absolute position determinator 370. Preferably, the intensity differential is normalized by the total intensity so that the peaks are independent of the beam intensity.

Referring to the reconstruction of the illumination from quadrature tracks, the diffraction from tracks 510 and 530 results in the reconstruction of a sine and cosine curve respectively at absolute position determinator 370. The reconstructed sinusoids have peaks and valleys at the edges of the grooves and zero crossings at the middle of the grooves and mesas. Zero crossings are areas where there are signals that change linearly with position. Furthermore, as noted, cosine track 530 is configured such that the reconstructed cosine curve will be 90 degrees out of phase from the reconstructed sine curve. This phase shift causes one curve or the other curve to always be in the linear range.

Referring next to the reconstruction of the illumination from address track 520, the light diffracted from track 520 communicates to absolute position determinator 370 whether or not the focused light beam-illuminating track 520 has crossed an edge, either groove to mesa or mesa to groove. Absolute position determinator 370 keeps track of these changes in order to build up a record of a whole address code word having n bits. As noted above, in the embodiments shown n is equal to 12, and thus absolute position determinator 370 can determine the absolute position of holographic storage disk 238 based on the reconstruction of any 12 bits in sequence. This is referred to as a frame invariant encoding scheme.

Absolute position determinator 370 is configured to read the signal from detectors 848, 948 only at particular times, i.e., times when absolute position determinator 370 expects an edge crossing. This is accomplished by using the illumination from cosine track 530. Due to the fact that cosine track 530 has a zero crossing right where address track 520 has a groove edge, absolute position determinator 370 uses the cosine zero crossing to clock the state of the address track edges (+edge, −edge, or no edge, determined by a threshold) into a shift register. Once a code word's worth is stored in the shift register, the edges are turned into 1s and 0s (ie. integrate to get grooves and mesas) to get an LFSR code word.

In another embodiment, absolute position determinator 370 is configured to read the signal from detectors 848, 948 based on an oscillator that is synchronized to the signal itself by means such as a phase-locked-loop (PLL). Such a method would require that holographic storage disk 238 be moving at a relatively constant speed, but would allow aspects of the invention to be practiced without the implementation of cosine track 530. Capabilities and techniques for implementing PLLs are well-established in the art.

In embodiments of the present invention, this code word is used as an index into a table to get the actual absolute position of holographic storage disk 238.

In other embodiments, absolute position determinator 370 is configured to clock an LFSR until it retrieves a code word matching the code word reconstructed from the illumination of holographic storage medium. In this embodiment, absolute position determinator 370 counts the number of clocks required to retrieve the matching code word, and the number of clocks in turn provide the position of holographic storage disk 238.

In further embodiments of the present invention, absolute position determinator 370 is configured to use the reconstructed sine and cosine curves to provide fine tuning of the absolute position of holographic storage disk 238. As noted, one or the other of the reconstructed sinusoids is always in the linear range. As a result, absolute position determinator 370 is configured to interpolate within the available linear range to further determine the absolute position of holographic storage disk 238.

It would be appreciated that methods other than push-pull detection may be used in embodiments of the present invention. For example, detectors 848, 948 could be configured to track the resulting light and dark patterns as the focused light beams cross grooves. In other embodiments, detectors 848, 948 are configured to track the resulting light and dark patterns as the focused light beams cross light and dark strips embossed on holographic storage disk 238.

It will be apparent to one or ordinary skill in the art that the method of encoding address track 520 constitutes "return-to-zero" (RZ) encoding wherein the track pattern includes a mesa (zero level) in half of each bit period regardless of whether a groove (one level) is present. It will also be readily apparent that one may use other methods of encoding, including but not limited to "non-return-to-zero" encoding (NRZ) (the entire bit period is a groove or a mesa depending on whether it's a one or a zero); "non-return-to-zero-inverted" encoding (NRZI) (the bit period contains an edge if the bit is a one, or no edge if the bit is zero), or "Manchester" encoding (the center of the bit period contains a groove-to-mesa edge for a zero, or a mesa-to-groove edge for a one).

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Further features of alternative embodiments of the present invention are described in US Patent Application No. 20040027668 entitled Medium Position Sensing, filed on Feb. 14, 2006, which is hereby incorporated by reference herein.

It will be appreciated by persons skilled in the art that numerous variations and/or modifications may be made to the invention as shown in the specific embodiments without departing from the spirit or scope of the invention as broadly described. For example, in the above embodiments the coherent light source 102 may be "always-on" and have no signal line provided by the drive electronics to control its on/off status. As another example, optical steering subsystem 104 may not be implemented as described above. In alternative embodiments, for example, optical steering subsystem 104 is configured to provide a fixed optical beam path; that is, the "steering" function does no involve any active direction changing. Such embodiments are considered to be included in the definition of the term "optical steering" or "light steering" as used herein. As another example, embodiments of the present invention have been described herein in the context of a holographic memory system in which two light beams, a data beam and a reference beam, are utilized to write data to the holographic storage medium. It should be appreciated, however, that embodiments of the present invention may be implemented in any holographic memory system now or later developed. One such contemplated application is a holographic memory system in which a single light beam is utilized to provide "collinear holographic storage." Furthermore, in the above embodiments, the object is a holographic storage medium in a holographic memory system. It should be appreciated, however, that the object may be any object on which embossed tracks may be disposed. The present embodiments are, therefore, to be considered in all respects as illustrative and not restrictive.

All documents, patents, journal articles and other materials cited in the present application are hereby incorporated by reference.

What is claimed is:

1. A device for sensing an absolute position of an encoded object, comprising:
    a position tracking module comprising:
    a track illumination module configured to illuminate said encoded object with one or more light beams, and to detect one or more light beams resulting from said illumination of said encoded object, wherein said track illumination module comprises: a source of light configured to generate a light beam, a light steering subsystem configured to divide said light beam into said one or more light beams incident on said encoded object, and a detector module configured to detect said one or more light beams resulting from said illumination of said encoded object by said incident light beams;
    an absolute position determinator configured to determine the absolute position of the encoded object based on said one or more light beams resulting from said illumination of said encoded object; and
    wherein said encoded object comprises an object having one or more embossed encoded tracks therein;
    wherein said one or more embossed encoded tracks comprise: 1) one or more quadrature tracks, said one or more quadrature tracks comprising: a sine track configured such that the reconstruction of illumination from said sine track results in the reconstruction of a sine curve; and a cosine track shifted from said sine track such that the reconstruction of illumination from said cosine track results in the reconstruction of a cosine curve phase shifted 90 degrees from said sine curve; and 2) an address track; and
    wherein said detector module is configured to detect a light beam transmitted through each of said encoded tracks.

2. The device of claim 1, wherein said light steering subsystem comprises:
    a grating configured to redirect said light beam into said three light beams configured to illuminate said encoded tracks.

3. The device of claim 2, wherein said detector module comprises:
    a six-element split detector configured to detect diffraction patterns resulting from the transmission of said illumination light beams from said encoded tracks;
    wherein said diffraction pattern for each said transmitted light beam is detected at a single pair of split element detectors; and
    wherein said detector module is configured to provide said absolute position determinator with signals based on said diffraction patterns.

4. A holographic memory system, comprising:
    an encoded recording medium configured to holographically store information, said encoded storage medium comprising: a medium having three or more embossed encoded tracks therein wherein said three or more encoded tracks comprise: 1) a plurality of quadrature tracks; and 2) an address track, said address track being a frame invariant encoded track, wherein said frame invariant encoded track comprises: a code generated by a linear feedback shift register (LFSR);
    at least one source of coherent light;
    a position tracking module comprising: a track illumination module configured to illuminate said encoded storage medium with one more light beams, wherein said track illumination module is configured to detect one or more light beams resulting from said illumination of said encoded storage medium and said track illumination module comprises: 1) a source of light configured to generate a light beam; 2) a light steering subsystem positioned between said source of light and said encoded object configured to redirect said light beam into said one or more light beams incident on said encoded object; and 3) a detector module configured to detect one or more light beams resulting from said illumination of said encoded object by said incident light beams;
    an absolute position determinator configured to determine the absolute position of said encoded storage medium based on said one or more light beams resulting from said illumination of said encoded storage medium; and
    wherein said detector module is configured to a light beam transmitted through each of said encoded tracks.

5. The system of claim 4, wherein said light steering subsystem comprises:
    a grating configured to redirect said light beam into said three light beams configured to illuminate said encoded tracks.

6. The system of claim 5, wherein said detector module comprises:
    a six-element split detector configured to detect diffraction patterns resulting from the transmission of said illumination light beams from said encoded tracks;
    wherein said diffraction pattern for each said transmitted light beam is detected at a single pair of split element detectors; and
    wherein said detector module is configured to provide said absolute position determinator with signals based on said diffraction patterns.

* * * * *